United States Patent [19]

Golladay et al.

[11] Patent Number: 4,804,944
[45] Date of Patent: Feb. 14, 1989

[54] HALL EFFECT LIQUID LEVEL SENSING APPARATUS AND METHOD

[76] Inventors: James D. Golladay, Montech Systems, Inc., 6595 Odell Pl., Suite C, Boulder, Colo. 80301; Joseph M. Elder, Jr., Boulder, Colo.

[21] Appl. No.: 91,848

[22] Filed: Sep. 1, 1987

[51] Int. Cl.$^4$ ............................................. G08B 21/00
[52] U.S. Cl. ................................. 340/624; 250/231 SE
[58] Field of Search ................... 73/305, 311, 314, 319, 73/321, DIG. 5, 312; 116/110, 228; 250/231 SE, 237 G; 200/84 C, 61.02; 340/623, 624, 618; 307/118

[56] References Cited

U.S. PATENT DOCUMENTS

| | | | |
|---|---|---|---|
| 3,017,771 | 1/1962 | Bonhomme | 73/314 |
| 3,459,042 | 8/1969 | Brown | 73/321 |
| 3,935,741 | 2/1976 | Zinsmeyer et al. | 73/311 |
| 3,975,633 | 8/1976 | Larkin | 250/231 SE |
| 4,065,968 | 1/1978 | Sunagawa | 73/321 |
| 4,126,040 | 11/1979 | Varacins et al. | 73/DIG. 5 |
| 4,155,254 | 5/1979 | Colditz | 73/311 |
| 4,192,187 | 3/1980 | Kennedy et al. | 73/321 |
| 4,480,469 | 11/1984 | Tice | 73/DIG. 5 |
| 4,536,660 | 8/1985 | Tetro | 307/118 |
| 4,554,494 | 11/1985 | Howeth | 73/305 |

Primary Examiner—Joseph A. Orsino
Assistant Examiner—Jill D. Jackson
Attorney, Agent, or Firm—Sherman and Shalloway

[57] ABSTRACT

Disclosed herein is a Hall-effect liquid level sensing apparatus and method. The device may be mounted on a liquid storage tank and includes at least one float suspended within the tank and floating upon a hollow tube for guidance. The float carries a permanent magnet and a Hall-effect sensor may be reciprocated within the hollow tube to sense the location of the permanent magnet and thereby the location of the float. The device further includes a control device including an optical encoder which enables the device to sense the depth in the hollow tube to which the Hall-effect device has travelled when it senses the height of the permanent magnet. The invention may be used in conjunction with a plurality of floats to determine not only the liquid level but also the level between the liquid and a diverse liquid contained within the same container. In this embodiment, the invention may also be used in conjunction with a specific gravity measuring device so as to ensure that the pressure sensing orifice of the specific gravity measuring device is suspended within the liquid the specific gravity of which is desired to be measured.

21 Claims, 3 Drawing Sheets

Fig. 5

HALL EFFECT LIQUID LEVEL SENSING APPARATUS AND METHOD

BACKGROUND OF THE INVENTION

The present invention relates a Hall-effect liquid level sensing apparatus and method. In the prior art, there has always been a need to determine the level of liquids which are stored in sealed tanks. Often, the environment within such a sealed tank is highly corrosive and dangerous including the formation of lethal gases and corrosive chemicals which would cause damage to conventional level sensing devices.

One intended environment of use of the present invention consists of the interior of a tank containing petroleum products such as oil. Mechanical float-type gauges have been used in this environment with considerable shortcomings due to the corrosive effects of the petroleum products as well as gases such as $H_2S$ which are formed in such petroleum product tanks. Mechanical float-type gauges have problems in durability in such an environment because they include complex pivot points, pulleys in some cases and other moving parts which are susceptible to wear, corrosion, etc.

Another method of level measuring which has been used in the intended environment of use consists of a float having a magnet associated therewith and the use of indirect reading through the use of limit switches, reed switches, and other devices to determine the level of the magnet and thereby the float. However, the prior art does not teach such a device which may be used for continuous measuring purposes. Furthermore, it is well known to utilize ultrasonic level sensing devices in storage tank measurements but in the environment of a petroleum storage tank wherein stratification of formed gases may occur, inaccuracies may exist since there is no way to accurately know the precise gaseous environment which is present within the tank above the liquid level and therefore the precise speed of the sound waves which will be created by the ultrasonic device may not be accurately measured. Since ultrasonic level measuring devices depend upon knowledge of the speed of sound in the particular environment used, such devices may become impractical in the petroleum storage environment.

An additional method of oil tank level measurement uses the differential pressure also known as the hydrostatic head for oil level measurements. The problem with this sort of level measuring device is that as these devices have been constituted in the prior art, one may never know for sure if the pressure sensor is immersed within the oil or whether it is immersed within another liquid which has accumulated below the oil level. Thus, a need has developed not only to provide a level sensor which overcomes the deficiency in the differential pressure method and apparatus, but also the need has developed to provide a device which may be used in conjunction with a level measuring device to monitor changes in the specific gravity of the oil within the tank.

A further apparatus and method which has seen wide usage in the measurement of the liquid level in a petroleum products tank consists of hand-measurement with a mechanical tape. This apparatus and method have serious disadvantages since they are time consuming, subject to errors by the operator, rely upon hand-written recording and expose the operator to any toxic gases which may be present in the tank.

The following prior art is known to Applicants:

U.S. Pat. No. 3,316,763 to DeGiers discloses a fluid level gauge having a pivoted float which when it pivots reciprocates a magnetic actuator which results in the reciprocation of follower permanent magnets to thereby result in measurement of the liquid level in the container. The mechanical interaction which must necessarily occur in the operation of the DeGiers device may easily be damaged and compromised in the corrosive environment of a petroleum products tank and accordingly the DeGiers teaching is believed to be deficient vis-a-vis the present invention.

U.S. Pat. No. 3,505,869 to Crawford discloses a liquid level sensing device including a piston member having attached thereto a magnet which is attached at a position adjacent one of the walls of the container, which wall has mounted thereon a plurality of magnetic reed switches. With this device, the level of liquid within the tank may be determined through knowledge of which one of the reed switches is closed. The accuracy of the Crawford device depends upon how closely spaced the magnetic reed switches are, and the closer they are spaced, the greater the likelihood that the single magnet may inadvertently actuate more than one switch simultaneously thereby compromising the accuracy of the device.

U.S. Pat. No. 3,935,741 to Zinsmeyer, et al. discloses a liquid level sensor which is able to sense the levels of two immiscible liquids in a tank. The device includes a first magnet carried by a float on top of one liquid and a second magnet carried by a float on top of the other liquid. The first magnet operates a switch to indicate when one liquid reaches a predetermined level and the second magnet moves a coded tape with respect to a read head in accordance with changes in the level of the other liquid. This device is quite complicated in design and the transmitter used requires a quite complicated operation sequence in its operation.

U.S. Pat. No. 3,964,312 to Sebek disclosed a magnetically actuated fluid level indicator wherein a float is provided with a magnet and the float is contained within a tube for reciprocation therein. On the side of the tube is mounted an indicating device including a plurality of indicator platelets which change their position of rotation as a result of the effect of the magnetic field lines thereon. Thus, the experienced operator may easily tell the specific height of the float within the tube by merely observing the postion of the platelets. This device is extremely cumbersome in design, requiring a plurality of platelets which may be expensive. Furthermore, this invention requires that the platelets be mounted in an area where they may be visually observed while being close enough to the magnets on the float to ensure the transmission of the magnetic field thereto. Thus, in the environment contemplated by Applicants, a thin wall would have to be provided in the petroleum tank, thereby creating the possibility of leakage or other system malfunction.

U.S. Pat. No. 4,078,430 to Pemberton, et al. discloses a dual liquid level indicating gauge which may measure the levels of two liquids contained in the same tank. The device includes two floats and each float has a measuring tape controlled thereby to provide an indication of the liquid level through a single viewing window above the tank. The requirement for two separate indicating tapes and the further requirement of a viewing window exterior of the tank renders this device extremely cumbersome and difficult to install. Furthermore, the fact that the measuring tapes are always immersed within the liquid increases the possiblity of malfunction due to the corrosive effects of the environment therein.

U.S. Pat. No. 4,227,171 to Masuda discloses a liquid level sensing means including a magnet for applying magnetic flux to a galvano-magneto effect transducing means with changes in the flux resulting from changes in the liquid level. Of course, the present invention differs from the invention of Masuda since the present invention includes the provision of the selective lowering of a Hall-effect device on a carefully calibrated tape to measure the liquid level.

U.S Pat. No. 4,284,904 to Tetro discloses a liquid level measuring device wherein a tape has a plurality of encapsulated network units assembled thereto and the tape may be utilized to follow a float carrying a permanent magnet so that the liquid level in the tank may be determined. The present invention differs from this device since in the present invention only a single Hall-effect sensor is used and the tape to which the Hall-effect sensor is attached is selectively actuated rather than continuously actuated so as to increase tape life by avoiding the corrosive effects of the tank environment while reducing the frequency of movement and wear.

U.S. Pat. No. 4,356,729 to Kubota, et al. discloses a fluid level detector including a float having a magnet attached thereto and wherein when the float contacts a stop, a switch is closed to thereby indicate the lower-most position of the float. The device of Kubota, et al. is believed to merely consist of a safety device which enables one to determine when the liquid level is at its lowest point. Of course, the present invention is much more detailed than the Kubota, et al. device, utilizing a Hall-effect device reciprocable on a tape to measure the level of a liquid within the tank.

U.S. Pat. Nos. 4,361,835 to Negy and 4,446,284 to Dummary each disclose liquid level detecting devices wherein a float or floats is/are reciprocably mounted over a tube having contained therein a column of sequential Hall-cells with each float having a toroidal magnet mounted thereon. The Hall-effect devices are actuated by the toroidal magnet of each float to indicate liquid level. The present invention has several advantages over the teachings of these patents, including the fact that only a single Hall-effect device is used and is selectively reciprocated within a tube about which a toroidal float is mounted having a permanent magnet contained thereon. The present invention is much simpler than the teachings of these patents and much more inexpensive and practical to install.

U.S. Pat. No. 4,425,796 to Boucher, et al. discloses a hermetically sealed tank gauge apparatus wherein a float is attached to a chain having a weight at its other end with the chain being attached to a gear so that movements of the float result in rotations of the gear and from the rotations of the gear the level of the fluid within the tank may be recorded. While this device has some similarities with the teachings of the present invention, especially in the monitoring of the rotations of a rotary member, the Boucher, et al. device is believed to be deficient vis-a-vis the teachings of the present invention in that unreliability may be attendant in a system wherein the corrosive effects of the fluid within the tank are continuously exposed to the mechanism in question. Furthermore, these corrosive effects may change the weight and other configurations of the float and/or weight to thereby cause resultant inaccuracies in the readings which may be obtained therefrom.

U.S. Pat. No. 4,467,647 to Yamane, et al. discloses a direct reading tank gauge having a tape of plastic or thin metal in an endless loop with an armature fixedly mounted to the tape. A tank float is magnetically coupled to the armature so that changes in the fluid level in the tank result in movements of the armature and thereby the tape, resulting in liquid level readings. Of course, the present invention differs from the teachings of Yamane, et al. for many reasons, especially in that there is no positive mechanical interaction between the float and the level measuring mechanism of the present invention but, rather, the passive interaction therebetween will result in increased accuracy in the readings obtained thereby.

U.S. Pat. No. 4,480,469 to Tyce discloses an adjustable differential fluid level float indicator which includes a float reciprocably mounted on a transparent tube with the float having a permanent magnet providing a magnetic field which may actuate magnetically sensitive switches within the tube to thereby enable the reading of the liquid level within the tank. While some similarities exist between the teachings of Tyce and those of the present invention, the present invention is quite advantageous over the teachings of Tyce as providing a device which enables the liquid level to be accurately determined without reliance upon the positions of a finite number of switches.

U.S. Pat. No. 4,532,800 to Coleman discloses a level indicator wherein a magnetic switch may be actuated by a permanent magnet carried by a follower to determine liquid level in the tank. Of course, the follower structure is quite cumbersome and since it is always exposed to the corrosive environment of the fluid and gases which may be in the tank, its reliability may be questionable in the long term.

In light of the prior art discussed above, and in view of the needs which have been developed for an inexpensive trouble-free and extremely accurate level sensing device which may be utilized in the corrosive environment of the interior of a tank containing petroleum distillates, the present invention has been devised so as to overcome the deficiencies and short comings of the prior art as delineated above.

SUMMARY OF THE INVENTION

The present invention solves many of the problems inherent in the prior art as delineated hereinabove. Furthermore the present invention is specifically designed to improve upon the teachings of prior U.S. Pat. No. 4,523,460 to Strickler, et al. The Strickler, et al. patent teaches a fluid measuring, testing and accounting system which enables the measuring, testing and accounting of oil stored in a tank battery adjacent a producing oil well system. The Strickler, et al. system includes the use of ultrasonic oil level measuring apparatus. As explained above, the corrosive atmosphere which is contained within an oil tank as well as the fact that gases which form above the oil level may be of a density and make-up not accurately known may result in inaccuracies and unreliability during the expected lifetime of such ultrasonic transducers. The main problem, as explained above, which occurs regardless of the lifetime of use of the transducers lies in the fact that the speed of the ultrasonic pulses may vary with variations in the particular atmosphere through which the pulses travel. Thus, when one does not clearly know the particular make-up of the atmosphere in which the pulses are traveling, it is extremely difficult to accurately determine that the level of measurements which are being made are completely accurate.

Thus, with the prior art known to Applicants in mind, including U.S. Pat. No. 4,523,460, the present invention was developed. The present invention includes the following interrelated aspects:

(a) In a first aspect of the present invention, while the present invention may be used in any environment where liquid level is to be measured, the present invention is specifically designed to be utilized on a long-term trouble-free basis in the environment of petroleum products storage tanks.

(b) As the present invention is contemplated, an elongate magnetically transparent tube is suspended from the top of the tank, extending, if desired, all the way to the bottom of the tank. Centered on this tube, preferably, are two floats, a first float weighted in such a manner that it is designed to float at the interface between water and oil which is often present at the bottom of a petroleum storage tank. A second float, also suspended on the magnetically transparent tube, is weighted in such a way that it will float on the surface of the oil or other petroleum product which is stored within the tank.

Each float has rigidly affixed thereto a permanent magnet. The particular shape of the magnet which is attached to each float may be toroidal or of a bar-type configuration. The important factor in magnet design is that the magnet must be designed so that its magnetic field may be sensed by a Hall-effect sensor.

(c) In the preferred embodiment of the present invention, the above-described magnetically transparent tube is suspended through an opening in the top of the tank which opening is closed by an annular sealing device which is designed to prevent escape of vapors or liquid from the tank. The sealing device has mounted thereover a storage device termed hereinafter an accumulator which has attached thereto the control circuitry for the present invention.

(d) An elongated slotted tape is retained within the accumulator in a folded configuration with one end of the slotted tape being fed into the transparent tube. At that end of the slotted tape, a Hall-effect sensor is mounted and in the preferred embodiment of the present invention, the wires to power-up the Hall-effect sensor and to transmit currents indicative of the fact that the Hall-effect sensor has sensed the presence of the magnetic field, are embedded within the slotted tape.

(e) Within the accumulator, the slotted tape is threaded through a drive mechanism including a sprocket, motor, encoder and controlling electronics. The tape is slotted so that it may interact with the drive system so that rotation of the sprocket will result in reciprocation in the slotted tape either downwardly or upwardly within the magnetically transparent tube as the case may be. The ends of the wires which are embedded within the tape and are remote from the Hall-effect sensor within the slotted tape are electrically connected to the controlling electronics for the drive system so that the drive system may be controlled responsive to sensing of the presence of the magnetic fields which are present in surrounding relation to the float magnets.

(f) In the preferred embodiment of the present invention, an optical system is utilized to determine the specific length of tape which has been suspended within the transparent tube to thereby determine the levels of the fluids within the tank. In one preferred embodiment of the present invention, a slotted disk is mounted to rotate with the tape drive sprocket described above. The slotted disk rotates so that its periphery is suspended, rotatably, within an optical switch consisting of a beam of light which may be interrupted by the slot in the slotted disk. In this way, the specific movements of the slotted disk and thereby the tape drive sprocket and slotted tape may be quite accurately monitored to thereby enable the system to accurately keep track of the specific vertical position of the Hall-effect sensor within the transparent tube.

(g) As stated above, each of the floats is mounted on the same magnetically transparent tube and if desired, the magnets which are mounted on the respective floats may be designed so that each one has a unique "signature" as read by the Hall-effect sensor. For example, they may be mounted on the respective floats so that their magnetic polarities are in reverse directions with respect to one another, or, alternatively, their intensities may be made different from one another.

(h) In a further aspect, a control device is included in the inventive system and is utilized to control movements of the tape drive sprocket, to receive electrical impulses from the Hall-effect sensor responsive to sensing of the float magnets, to take readings based upon the sensed operation of the optical switch, and may also include means for recording data related to measurements taken by the Hall-effect sensor. If desired, the controller may also include means for displaying the sensed data as well as printing it out on a permanent record such as a tape, voucher, etc.

(i) In a further aspect, the present invention may, if desired, include associated therewith a device for determining the specific gravity of the oil within the tank which may be a determinant factor in the selling price of the oil. In this aspect, the specific gravity sensor may be mounted at the bottom of the tank at a specific predetermined level. The Hall-effect sensor may be utilized to sense the height of the float at the water-oil interface so as to ensure, through knowledge of the specific elevation of the specific gravity sensor, that the specific gravity sensor is immersed within the oil rather than within the water. Thereafter, the height of the float at the level of the upper surface of the oil may then be determined and from the information at hand, namely the height of oil abvove the pressure transducer, the specific gravity of the oil may be easily calculated.

(j) Of course, methods involving the use of the apparatus embodiments as set forth hereinabove are also contemplated by the inventors.

Accordingly, it is first object of the present invention to provide an improved Hall-effect liquid level sensing apparatus and method.

It is a still further object of the present invention to provide such a device which is extremely simple in design and durable even in the corrosive atmosphere of a petroleum products storage tank.

It is a still further object of the present invention to provide such a device which utilizes magnets attached to the float or floats contained within the storage tank and a Hall-effect sensor to sense the position(s) of the float(s) within the tank.

It is a still further object of the present invention to provide such a device which utilizes an optical system for detecting the precise position of the Hall-effect sensor within the tank so as to improve accuracy in the readings thereof.

It is a still further object of the present invention to provide such a device which enables the recording, display and printing out of data related to the liquid level within the tank as desired.

It is a yet further object of the present invention to provide such a device with the further inclusion of a specific gravity sensor with the present invention being utilized to ensure that the specific gravity sensor is immersed within the petroleum products rather than other liquids which may form therebeneath.

These and other objects, aspects and features of the present invention will be better understood from the following detailed description of the preferred embodiments when read in conjunction with the appended drawing figures.

SPECIFIC DESCRIPTION OF THE PREFERRED EMBODIMENTS

Figure 1:
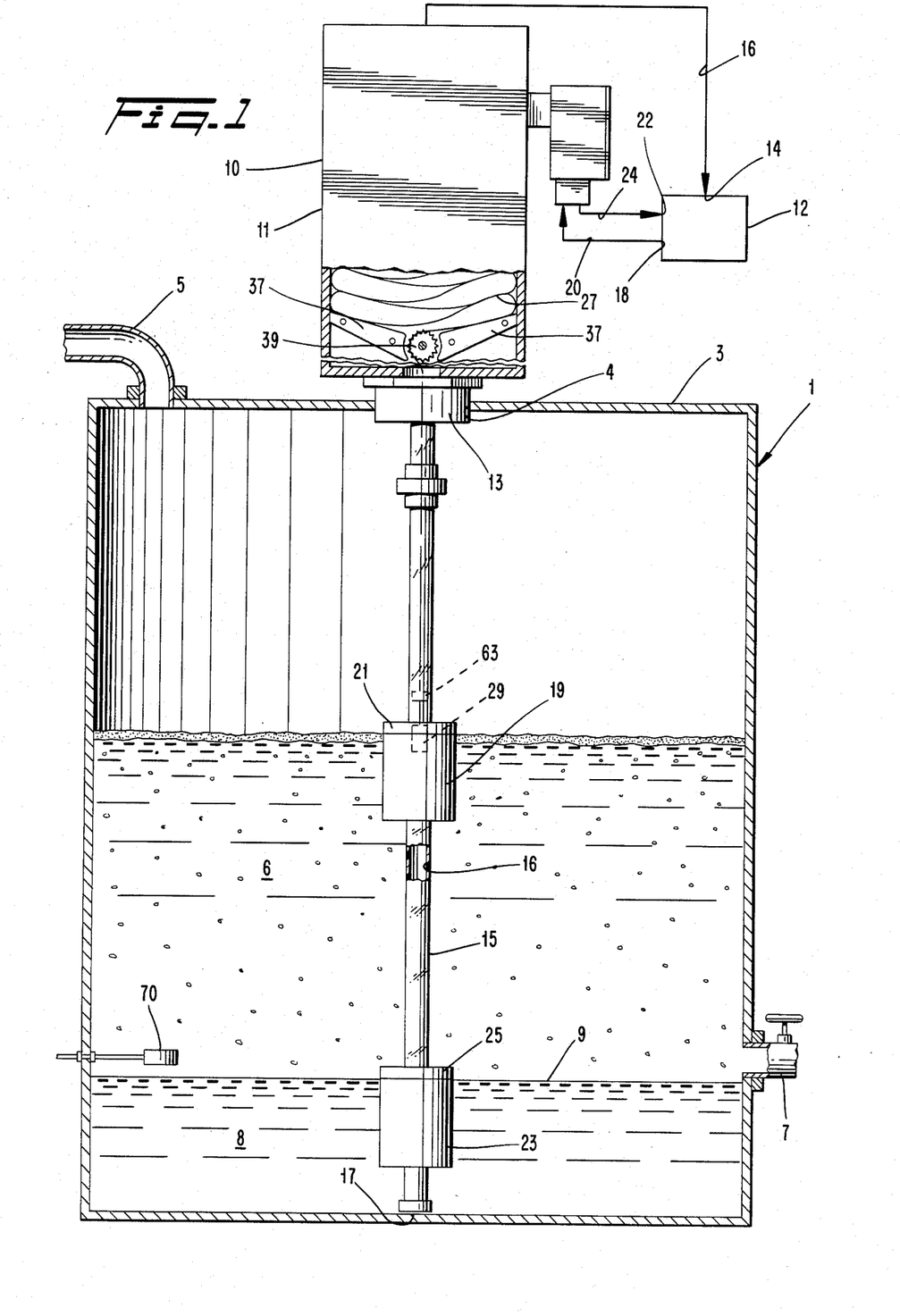
FIG. 1 shows a side view of a preferred embodiment of the present invention with portions thereof being shown in cross-section for detail.

Reference is first made to FIG. 1 wherein the inventive level sensing device 10 is seen to be mounted in association with a tank 1 having a roof 3, an inlet pipe 5 in the roof 3, an outflow pipe 7 in a side wall of the tank and within the tank, a volume 6 of a lighter fluid such as, for example, water to define therebetween an oil-liquid interface 9.

Mounted on the roof 3 of the tank 1 is an accumulator 11 having a lower sealing grommet 13 which is inserted through an opening 4 against leakage of gas or fluid from the tank 1. Attached to the accumulator 11 and extending through an opening formed through the grommet 13 is a magnetically transparent tube 15 which is made of a material which allows magnetic field forces to pass therethrough without resistance or alteration of these forces. The tube 15 extends from the accumulator 11 all the way down to the bottom 2 of the tank 1 and may include a cap and stop member 17 at its lowest extent so as to be sealed from the liquid.

In the preferred embodiment of the present invention, the tube 15 has slidably received thereon a float 19 and a float 23 with the float 19 having mounted at its uppermost portion a magnet 21, while the float 23 has mounted at its uppermost portion a magnet 25. These magnets are permanent magnets and since each float comprises an annulus slidably received about the tube 15, correspondingly, the magnets 21 and 25 are also annular so as to provide a uniform magnetic field extending radially inwardly through the tube 15.

The weight per unit volume of the float 19 is chosen so that it will float at the surface of the fluid 6 so that the level of the magnet 21 corresponds to the surface of the fluid 6. The weight per unit volume of the float 23 is chosen to be between the respective specific gravities of the fluids 6 and 8 so that the float 23 will float at the surface of the fluid 8 in such a manner that the location of the magnet 25 will be at the interface 9. Thus, variations in the respective liquid levels of the fluids 6 and 8 will result in corresponding movements of the respective floats 19 and 23 so that the respective magnets 21 and 25 are always at a level indicative of the respective levels of the fluid 6 and the interface 9.

Within the magnetically transparent tube 15, an elongated passageway 16 is formed and within this passageway, a slotted tape 27 may reciprocate. The slotted tape 27 is stored in the accumulator 11 in an accordian-type configuration as best seen in FIG. 1 with the tape being guided into the back and forth configuration shown. At the bottom end of the slotted tape 27, a Hall-effect sensor card 29 is mounted and the circuitry contained thereon is electrically connected through the slotted tape 27 to the microprocessor control device to be described in greater detail hereinafter. For this purpose, as best seen with reference to FIG. 2, the slotted tape 27 includes two wires 31 on one side of the tape and 33 of the other side of the tape which wires 31 and 33 are laterally spaced by the slots 35 in the tape. The wires 31 and 33 are connected on one end to the Hall-effect sensor card 29 and at the other end thereof through the slotted tape 27 to the microprocessor control device.

Figure 4:
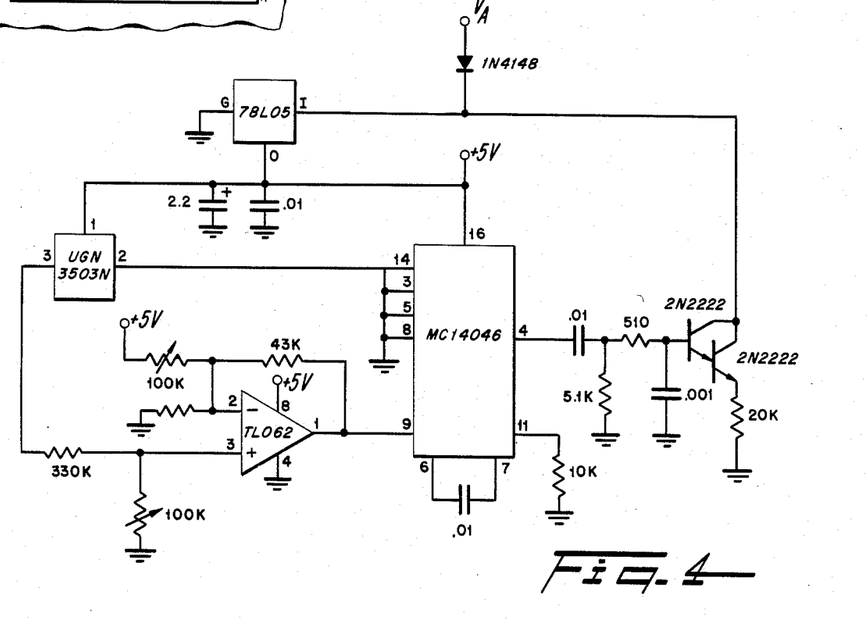
FIG. 4 shows the electrical circuitry which is used in the Hall-effect sensor card of the present invention.

As will be described in greater detail hereinafter, the Hall-effect sensor card 29 includes circuitry thereon which transforms magnetic field intensity into a train of pulses, having a frequency inversely proportional to the magnetic field intensity. Thus, higher frequencies indicate higher magnetic strength than lower frequencies. Thus, as the Hall-effect sensor card 29 approaches a position lateral to one of the floats, the microprocessor will note this fact through the decreasing of the period of the pulses followed by the increasing of the pulses. The shortest periods will occur when the card is precisely lateral to the magnet 21 or 25. Thus, detection of this peak in magnetic field intensity constitutes detection of the particular location of the magnet and thereby the float.

As seen in FIG. 1, guide arms 37 are provided at the bottom of the accumulator 11 adjacent the tape drive sprocket to guide the tape 27 in its upward and downward movements and so as to ensure the proper storage of the tape 27 within the accumulator 11 as illustrated in FIG. 1.

As explained above, the Hall-effect sensor card 29 may interact with the magnets 21 and 25 so that the operator of the system 10 will be able to determine the level of the fluid 6 and of the interface 9. Of course, in order to relate the electrical pulses emanating from the Hall-effect sensor card 29 to the level of the fluid 6 and of the interface 9, some means must be provided to determine how much tape 27 has been paid out from the accumulator 11 and with knowledge of the amount of tape 27 paid out, these levels may be determined.

Figures 2, 3:
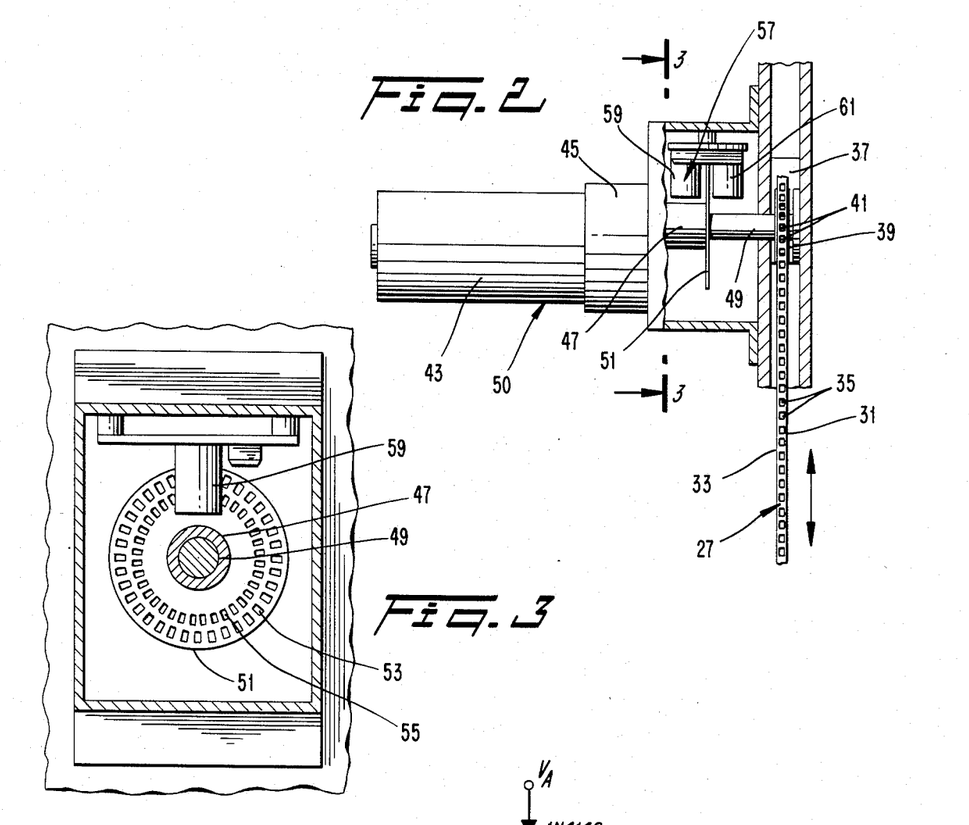
FIG. 2 shows a side view of the drive means for the slotted tape of the present invention as well as the optical system which is used to determine the amount of slotted tape which has been extended within the tank.
FIG. 3 shows an end view of the optical system shown in FIG. 2.

For this purpose, the present invention includes a system for precisely determining how much of the slotted tape 27 has been reciprocated into or out of the tank 1. With reference now to FIGS. 2 and 3, it is seen that the sprocket 39 has a plurality of teeth 41 thereon which teeth are designed to enter the slots 35 in the slotted tape 27 so as to enable the tape 27 to be reciprocated up or down within the tube 15. As best seen in FIG. 2, the inventive device 10 further includes a motor 43 connected through a gear box 45 to a drive shaft 47 which is connected to the tape drive sprocket 39 through a further drive shaft 49 which is axially aligned with the drive shaft 47 but is of smaller diameter. Interposed between the drive shafts 47 and 49 and fixed thereto is a slotted disk 51 which, as best seen in FIG. 3, includes two circumferential circles of slots 53 and 55 respectively. With reference back to FIG. 2, the slotted disk 51 rotates with its peripherial edge passing between two halves of an optical switch 57 which includes a source of light 59 and a receiver 61 for the light emanating from the source 59.

Light from the source 59 shines in the direction of the receiver 61 and may only pass through the slotted disk 51 when a slot 53 or 55 is aligned with the light beam emanating from the source 59. Thus, as the motor 43 via the shaft 49 rotates the tape drive sprocket 39, the slotted disk 51 will also rotate at the same rotative speed and the number of rotations of the sprocket 39 and thus the distance of travel of the slotted tape 27 may be easily determined by counting the number of pulses of the optical switch 57 which are caused by consecutive slots 53, 55 being aligned and successively misaligned with the beam of light emanating from the source 59. Each interruption of the beam of light from the source 59 will cause the turning off of an electrical circuit whereas every time a slot 53, 55 is aligned with the beam of light from the source 59, the same switch will be turned to the on position. Thus, by monitoring the number of times the switch is turned on and off, the number or rotations of the tape drive sprocket 39 may be easily monitored since information is programmed into the microprocessor control device of the present invention as the number of slots 53, 55 per revolution of the tape drive sprocket 39.

If desired, the slots 53, 55 may be encoded so that the microprocessor control device will know which direction the tape drive sprocket 39 is turning and, thereby, whether the slotted tape 27 is moving up or down. In fact, by having two sets of slots, 53, 55 one may determine both distance and direction of tape travel. Note that the slots are orthogonal and two bits of data are thus available (known as "Gray Code"). The electrical signals from these slots cause code changes enabling direction determination. Alternatively, since up and down movements of the slotted tape 27 are controlled by reversals of the direction of rotation of the motor 43, electrical connection may be made between the motor 43 and the microprocessor control device so that data indicative of the direction of the motor 43 is always transmitted to the microprocessor control device.

With reference back to FIG. 1, it is seen that a mechanical block 63 is attached to the slotted tape 27 and moves therewith. A limit stop (not shown) is contained within the tube 15 and when the tape 27 has been retracted a predetermined distance causing the reference block 63 to engage the stop, the motor 43 is thereby stalled causing the microprocessor control device to be notified that the Hall-effect sensor card 29 has reached the fully retracted reference position. It is to this particular point of reference that all subsequent downward motions of the sensor card 29 via reciprocations of the slotted tape 27 are referred.

With the present invention having been described in detail hereinabove, the intended operation thereof will now be explained. As the device is programmed, when the system is first powered up, the microprocessor control device will activate the motor 43 to retract the slotted tape 27 with the Hall-effect sensor card 29 attached thereto into the fully retracted position which corresponds to the point where the mechanical block 63 engages the stop, described above, to cause the motor to stall indicating to the microprocessor control device that the slotted tape 27 has arrived at the fully retracted reference position thereof.

At this point, as it is intended to have the microprocessor control device programmed, the microprocessor control device activates the motor 43 to reciprocate the slotted tape 27 downwardly within the transparent probe tube 15 while the Hall-effect sensor card 29 monitors the magnetic field. As explained above, the magnetic field is represented to the microprocessor control device by means of a series of periods the width of which are inversely proportional to the magnetic field intensity with shorter periods indicating higher magnetic strength than longer periods. When the Hall-effect sensor card 29 approaches the first float 19 with its attached magnet 21, the decreased period of the pulses will indicate to the microprocessor control device that the magnetic field intensity is increasing and the microprocessor control device will be thus notified by the Hall-effect sensor card 29 when the peak has been reached which is indicative that the sensor card 29 has arrived at the top of the float 19 corresponding to the surface of the liquid 6 (FIG. 1). As it is intended to program the microprocessor control device, when the position of the peak in the magnetic field has been noted, the microprocessor control device stops the motor 43, then is reactivated to raise the slotted tape 27 and the sensor card 29 a small increment such as, for example, one inch, and then the motor 43 is again reversed to lower the card 29 to reconfirm the level of highest magnetic field intensity. At this point, after confirmation of the level of highest magnetic intensity has been confirmed, the height at which this magnetic intensity was measured within the tank is recorded.

Thereafter, the microprocessor control device maintains the motor 43 in a stopped condition and allows the Hall-effect sensor card 29 to periodically, say every 1½ seconds, measure the magnetic field strength through observation of the period of the pulses which are created by the card 29 in relation to the magnetic field strength at that particular elevation within the tank. If, during one of these periodic measurements, the magnetic field strength has changed from its previous reading, indicating a change of liquid level of above a certain amount, say, for example, ±0.05 inches, and update measurement is taken by moving the sensor card 29 until the elevation of highest magnetic field intensity is once again detected. Since the microprocessor control device does not know which direction the float had travelled to cause the changed reading, the microprocessor control device must be pre-programmed to move the sensor card 29 in one direction or another. In the preferred embodiment of the present invention, the microprocessor control device is pre-programmed to first move the card 29 upwardly a small increment and if the float is not discovered during such upward movements, the microprocessor control device will control the motor 43 to lower the card 29 until the float is again rediscovered. If during these upward and downward movements, the float is not found by the card 29, a recalibration procedure is carried out wherein the tape 27 is reciprocated upwardly until the mechanical block 63 (FIG. 1) engages the associated limit stop so that microprocessor control device knows that the slotted tape 27 is at its uppermost positions. Thereafter, measurements may be carried out as first explained hereinabove. If, on the other hand, the short movements of the sensor card 29 result in rediscovery of the float, the new location thereof is recorded in the memory of the microprocessor control device.

The microprocessor control device of the present invention is schematically shown in FIG. 1 with the reference numeral 12 and has its input port 14 connected to the wires 31, 33 of the slotted tape 27 via an electrical conductor 16. Further, the microprocessor control device 12 has an output port 18 which is connected to the system 10 via a further electric conductor 20 with the output port 18 emitting control signals to control the electrical components of the system 10 including the motor 43 and the optical switch 57. Further, an input port 22 of the microprocessor control device 12 receives signals from the electronics of the system 10 including signals from the optical switch 57, via the conductor 24.

Figure 5:
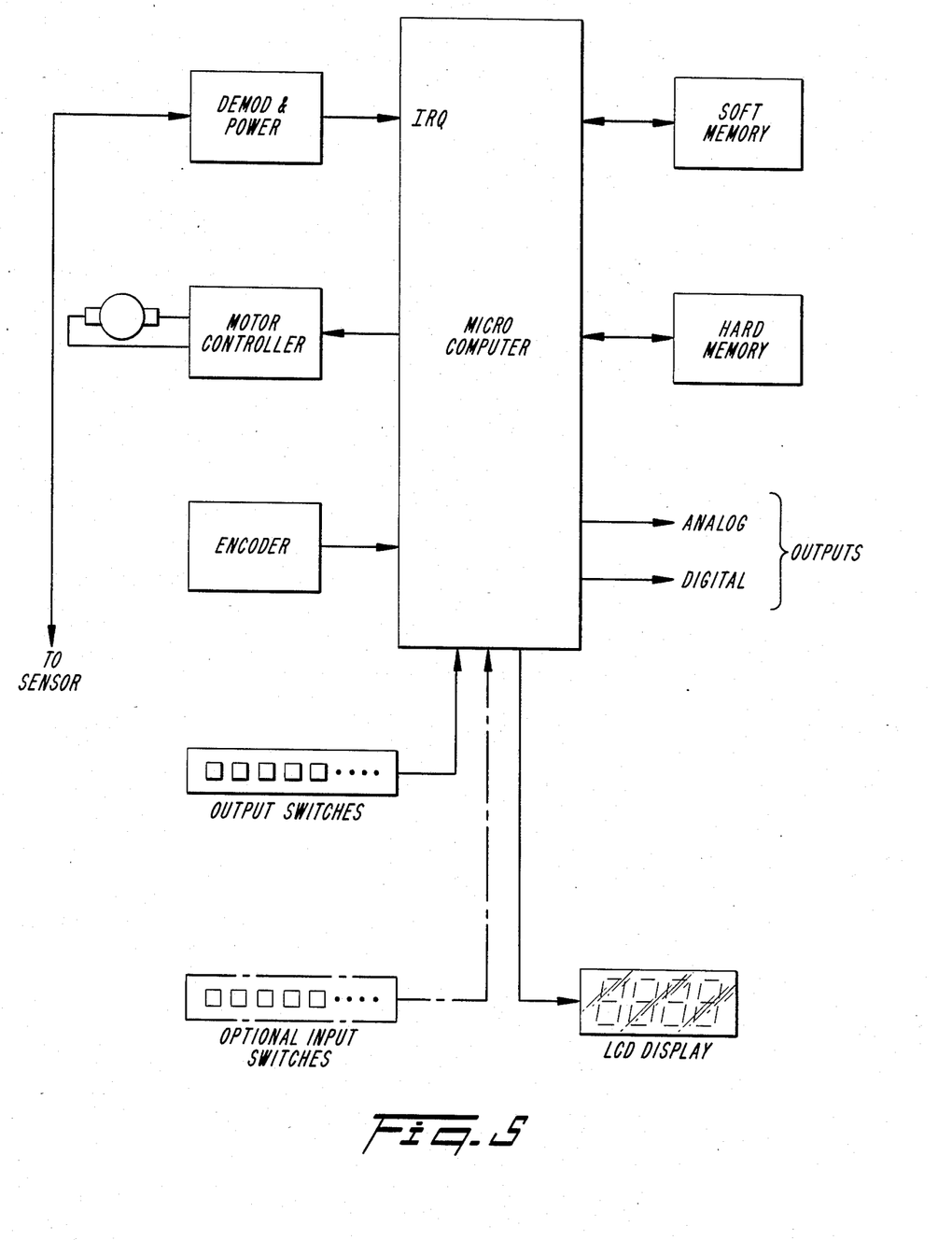
FIG. 5 shows a detailed block diagram of the electrical circuitry of the present invention.

The microprocessor control device 12 is pre-programmed using a software package so that the microprocessor control device 12 may control the system 10 both by initiating actions of the electronics thereof and by receiving signals indicative of the conditions sensed by the system 10, and responsive thereto, may emit control signals to control the system 10. The microprocessor control device 12 includes an integral memory including hard and soft memory portions whereby the functions of the device 12 may be pre-programmed in the hard section and whereby data received from the operation of the system 10 may be temporarily stored in the soft section and may be selectively displayed and/or may be permanently recorded on paper. FIG. 5 shows a detailed block diagram circuitry description.

Now, the logic which is used in searching for one or more floats slidably mounted on the magnetically transparent tube 15 as seen in FIG. 1 will be explained. The software which has been used to program the microprocessor control device 12 uses the same logic each time in searching for a float except when it is performing a complete recalibration. A recalibration of the measurements will occur under the following conditions:

(a) A recalibration switch may be activated on the control device for the microprocessor control device 12 which is seen by the device 12 as a logic 0 which indicates that a recalibration is to be made each time a level is read.

(b) A recalibration may occur when a counting device programmed by the software has reached a predetermined number, which predetermined number may be pre-programmed into the hard memory. This counter tracks the number of times a search has been made for a float since the last recalibration and this number is cleared each time a recalibration is made.

(c) If the normal search pattern of the system 10 has been undertaken and a float or floats has (have) not been found, then the system is recalibrated.

After power is applied to the Hall-effect sensor card 29 each cycle of the waveform will interrupt the processor on the interrupt request line corresponding to the conductor 16. The frequency of this waveform is proportional to the strength of the magnetic field. The frequency count is monitored by using the microprocessor's internal timer data register. The timer data register is read and then reset to all 1's each time the micrdprocessor 12 is interrupted. The value read is referred to as the frequency count. The timer data register automatically decrements to zero, so by reading this register each time a waveform interrupt occurs, a comparison can be made of the length of each cycle of the waveform. Since the timer decrements from a maximum value of, for example, 255, a higher frequency count implies a shorter waveform cycle and closer proximity to the magnetic field surrounding the float. Movement of the tape 27 is monitored by reading signals from the optical encoder subsystem 50 including the switch 57. Two input bits from the encoder subsystem advance through a set from one slot of the encoder to the next. Direction of chain movement also can be determined by comparison of the slot codes from a slot code formed in the encoder. The software logic operates in two levels of code. One section of the code is executed each time the processor receives an interrupt of the processor through waveform cycles or a timer interrupt. The other section of code is running continuously in the background and is controlling the search for the float.

A reset of the processor 12 causes all variables in RAM (the soft memory) to be cleared to all zeroes and the parallel ports which interface to the hardware to be initialized. If the EEPROM (electrically erasable programmable read only memory) (hard memory) switch on the controller board is set in the "on" position, the EEPROM is erased to all 1's. This switch may be used on an initial power on of a level to ensure that the EEPROM is properly initialized. The level is then recalibrated.

A switch on the controller board set in the "on" position to indicate that recalibration of the level is to be made. If the recalibration switch is not in the "on" position, the EEPROM is read. Previously written to the EEPROM are the last encoder slot count, the last encoder signal code and the above described software recalibration counter. Also written to the EEPROM are pointers to this data. Pointers are re-written to the EEPROM only when the data positions on the EEPROM are no longer dependable. At that time, the pointers are updated to a new position on the EEPROM and data is written to that location.

If valid data has been read from the EEPROM, this data is used to initialize the appropriate RAM variables. The float is then "found" by the software as described hereinbelow. The number of encoder slots for the "found" position of the float is then converted by the device 12 to feet and inches and fractional inches and written to the associated readout device and/or any other attached devices such as displays, printout, etc.

In recalibration, to ensure that the interrupt to the processor is synchronized with the frequency waveform interrupts described above, the software waits for a valid frequency interrupt signal to appear and to clear before the actual interrupts to the processor are enabled. A bit flag alerting the code monitoring the tape 27 to initialize the encoder code variables is set then cleared following initialization. The sensor is moved to the top of the level until the block 63 engages the stop described above and the encoder slot counter is initialized to 0. The sensor then is moved down until the float is encountered and recalibration is complete.

To find the float, the encoder slot counter is first checked for reasonableness. If the sensor appears to be at the bottom of the tank or above the top of the tank, a counter is incremented for the number of times the sensor has failed to find the float. If the counter is at greater than a predetermined number, the attached device is sent a code consisting of the hex value ####.

Otherwise, a recalibration is made and a new attempt to find the float is initialized.

The search pattern for the float consists of sending the sensor up a predetermined number of inches then down the same distance plus a set number of downward inches. If the float has not been found during this search, a recalibration is made. When the float is found, to improve accuracy, the sensor is moved up, for example, one inch from the "found" position then down until it is located again, thus always approaching the float from the same direction and at a lower velocity, having not had time to build up full speed.

If two floats are attached to the system, the software either will search for the floats in sequence—top float then bottom float—or will search for a specific float upon commands received via a serial communications interface, as programmed.

Movements of the tape 27 are monitored by reading a Gray code sent by the encoder over two parallel lines to the processor. The Gray code sequence in the down direction is read by the processor as, for example, 0, 2, 3, 1. The software which monitors this Gray code is processed during an IRQ frequency interrupt transmitted on the conductor 16. The current Gray code is read and compared to the previous reading. If no change is detected, a "no change" counter is incremented, and the tape monitoring routine is exited. If any change is detected between the two readings, the "no change" counter is cleared and the encoder slot counter is adjusted by the number and direction of the slot movement. If the motor is enabled, the encoder slot count is compared with the desired slot count. If the desired count has been reached, the motor is turned off.

A hardware timer is set to give the microprocessor control device 12 a timer interrupt. This timer is cleared and reset each time an IRQ interrupt is received, so a timer interrupt should not normally occur but is used as a backup method of error recovery in case of a sensor failure. If the processor does receive a timer interrupt, a bit flag is set to logic 1 to indicate that the next IRQ interrupt may be invalid due to the masking of the interrupt line during the timer interrupt code execution. A software counter is incremented and is compared to the maximum number of timeouts allowed. If this maximum number has not yet been reached, the timer is reset, the optical encoder is checked for any movement of the tape, and control is returned to the code being executed prior to the timer interrupt. If too many timer interrupts have occurred, a message consisting of hexidecimal $FFFF is sent to any attached devices indicating that the sensor is not operating correctly. This message indicates to the operator that maintenance may be necessary.

After receiving an IRQ interrupt, described above, the hardware timer is reset and the counter for the maximum number of timer interrupts allowed is cleared. If the pin on the parallel port which indicates a frequency interrupt has occurred is clear, the execution of the IRQ interrupt code continues. Otherwise, something else has generated the IRQ interrupt and this reading of the frequency count will be ignored.

If a frequency interrupt has occurred and if the bit flag indicating that this may not be a valid reading is set, the flag will be cleared, the tape 27 movement monitored, and control will be returned to the code which was being executed before the interrupt occurred.

If a valid reading has occurred, the previous frequency count is compared with the current count. If the difference between the two is greater than a predetermined amount set in firmware, the current reading is considered to be invalid and is not saved. The tape movement is monitored and control is returned to the background code.

If the frequency count is valid, it is compared to the lowest possible counter value which could still be within the float's magnetic field. If the count is not within range, the variable indicating the highest frequency count obtained is cleared to zero, a bit flag is set indicating a valid count has been obtained, tape movement is monitored, and control is returned to the background code. The valid, in-range frequency count is compared to the highest frequency count that has been read. If the current reading is higher than the highest reading obtained so far, the current reading is saved as the highest, a bit flag is set indicating a new high reading has been found, and the tape position when this reading occurred is saved as the chain position of the highest frequency count. The current frequency count is saved as the last frequency count. If the motor is enabled, the bit flag indicating that a search is being made for the float is set, and the bit flag for the highest frequency count is set, a comparison is made between the highest frequency count and the current count. If the current count is less than the highest count by a predetermined amount set in firmware, the peak has been passed. The position of the chain when the highest reading was obtained is saved as the position of the chain when the float was found. The motor is turned off, the bit flag indicating a search is underway for the float is cleared, the bit indicating a valid frequency count is set, the chain movement is monitored, and program control is returned to the background code.

In a final aspect, the present invention may include a differential pressure gauge 70 designed to measure the specific gravity of the oil in the tank.

Accordingly, an invention has been described in terms of structure and method of operation of the structure, which invention fulfills each and every one of the objects as set forth hereinabove and provides a system for accurately measuring the level of fluid in a tank with accuracy and reliability not previously known. Of course, various modifications, alterations and changes in the teachings of the present invention may be contemplated by those skilled in the art and these modifications, alterations and changes are considered to be included in the teachings of the present invention. Accordingly, it is intended that the present invention only be limited by the terms of the appended claims.

What is claimed is:

1. An improved level sensing device for mounting in an enclosure, said enclosure having fluid therein, the level of which is to be monitored, said device comprising:
   (a) an elongated tube mounted vertically in said enclosur and having a passageway therethrough;
   (b) at least one float slidably guided by said tube and having a magnet mounted thereon;
   (c) an accumulator mounted on said enclosure and having said tube mounted thereon, said accumulator having an opening in communication with said passageway;
   (d) an elongated tape stored in said accumulator and adapted to be reciprocated through said opening and within said tube;
   (e) said tape having a first end electrically connected to control means for controlling said device and a second end having connected thereto magnetic sensing means for sensing the magnetic field emanating from said magnet; and (f) tape sensing means for sensing the vertical position of said magnetic sensing means and communicating first signals indicative of said vertical position to said control means, said control means receiving second signals from said magnetic sensing means indicative of the vertical position of said float and calculating from said first and second signals the level of fluid in said enclosure.

2. The invention of claim 1, wherein said tube is transparent to said magnetic field.

3. The invention of claim 1, wherein said float is annular and surrounds said tube.

4. The invention of claim 3, wherein said magnet is annular and is mounted on the top of said float, said magnet emitting a magnetic field which extends through said tube.

5. The invention of claim 1, wherein said tape comprises an elongated flexible member of ladder-like configuration with two elongated legs connected at spaced intervals by a plurality of crosspieces defining slots therebetween, each said leg having embedded therein an electrical conductor, said conductors being interconnected between said magnetic sensing means and said control means.

6. The invention of claim 5, wherein said accumulator has mounted therein drive means for reciprocating said tape and including a sprocket rotated by a motor via a drive shaft, said sprocket having teeth interengageable with said slots to move said tape.

7. The invention of claim 6, wherein said tape sensing means includes a disc with slots circumferentially spaced thereon and mounted on said drive shaft and rotating along with said sprocket, and an optical switch sensing said disc slots and conveying to said control means indication signals indicative of said sensing of said disc slots, said indication signals comprising said first signals.

8. The invention of claim 1, wherein said enclosure has stored therein first and second fluids of differing fluid, said at least one float comprising first and second floats, each said float having a magnet mounted thereon, said first float floating on the surface of said first fluid and said second float floating at an interface between said first and second fluids.

9. The invention of claim 1, further including a differential pressure sensor mounted on said enclosure for measuring the specific gravity of said fluid.

10. The invention of claim 1, wherein said magnet sensing means comprises a Hall-effect sensing circuit.

11. The invention of claim 1, wherein said control means includes means for periodically activating said magnetic sensing means so that said vertical position of said float is periodically determined.

12. A method of measuring the level of fluid in an enclosure having a float vertically guided therein including the steps of:

(a) providing said float with a magnet;
(b) guiding said float on a tube;
(c) controllably moving a magnet sensor within said tube on a tape;
(d) sensing the location of said magnet with said sensor;
(e) measuring the length of tape in said tube when said sensor has sensed said location; and
(f) calculating said fluid level with control means.

13. The method of claim 12, wherein said moving step comprises moving a Hall-effect sensor in said tube.

14. The method- of claim 13, wherein said moving step further includes the step of suspending said sensor on a tape and reciprocating said tape within said tube.

15. The method of claim 14, wherein said measuring step comprises measuring the length of tape in said tube by monitoring drive means for said tape.

16. The method of claim 14, wherein said measurin step further comprises optically measuring the length of tape in said tube.

17. The method of claim 16, wherein said drive means includes a slotted disc rotatable within an optical switch, said optical switch measuring rotations of said disc.

18. The method of claim 12, further including the step of calibrations said control means after a predetermined number of calculating steps.

19. The method of claim 12, further including the step of measuring the specific gravity of said fluid.

20. The method of claim 12, wherein said enclosure has a plurality of floats vertically guided on said tube, a first float floating on the surface of said fluid and a second float floating on the interior between said fluid and a further heavier fluid, each said float having a magnet mounted thereon, said calculating step including the sequential calculation of the levels of said floats.

21. The method of claim 12, wherein said sensing step is carried out periodically.

* * * * *

UNITED STATES PATENT AND TRADEMARK OFFICE
CERTIFICATE OF CORRECTION

PATENT NO.  : 4,804,944
DATED       : February 14, 1989
INVENTOR(S) : JAMES D. GOLLADAY ET AL.

It is certified that error appears in the above-identified patent and that said Letters Patent is hereby corrected as shown below:

Claim 1, lines 5 and 6 of the claim, "enclosur" should read --enclosure--.

Claim 8, line 2 of the claim, after "differing", --specific gravities, said first fluid being above said second-- should be inserted.

Claim 14, line 1 of the claim, "method-" should read --method--.

Claim 16, line 1 of the claim, "measurin" should read --measuring--.

Claim 20, line 4 of the claim, "interior" should read --interface--.

Signed and Sealed this

Twentieth Day of June, 1989

Attest:

DONALD J. QUIGG

Attesting Officer

Commissioner of Patents and Trademarks